United States Patent
de Man et al.

(10) Patent No.: US 11,154,070 B2
(45) Date of Patent: Oct. 26, 2021

(54) PROCESS FOR PREPARING FAT CONTINUOUS EMULSIONS LOW IN FAT

(71) Applicant: UPFIELD US INC., Englewood Cliffs, NJ (US)

(72) Inventors: Teunis de Man, Maassluis (NL); Frederik Michiel Meeuse, The Hague (NL)

(73) Assignee: UPFIELD EUROPE B.V., Rotterdam (NL)

( * ) Notice: Subject to any disclaimer, the term of this patent is extended or adjusted under 35 U.S.C. 154(b) by 207 days.

(21) Appl. No.: 15/776,538

(22) PCT Filed: Nov. 8, 2016

(86) PCT No.: PCT/EP2016/076921
§ 371 (c)(1),
(2) Date: May 16, 2018

(87) PCT Pub. No.: WO2017/084910
PCT Pub. Date: May 26, 2017

(65) Prior Publication Data
US 2018/0325137 A1 Nov. 15, 2018

(30) Foreign Application Priority Data
Nov. 20, 2015 (EP) .................................. 15195619

(51) Int. Cl.
*A23D 7/04* (2006.01)
*A23D 7/005* (2006.01)
*A23D 7/015* (2006.01)
*A23D 7/02* (2006.01)

(52) U.S. Cl.
CPC ............. *A23D 7/04* (2013.01); *A23D 7/0056* (2013.01); *A23D 7/015* (2013.01); *A23D 7/02* (2013.01)

(58) Field of Classification Search
CPC ........ A23D 7/05; A23D 7/013; A23D 7/0056; A23D 7/04
See application file for complete search history.

(56) References Cited

U.S. PATENT DOCUMENTS

| 3,472,661 A | 10/1969 | Melnick et al. |
|---|---|---|
| 6,322,843 B1 | 11/2001 | Schuurman et al. |
| 2001/0016223 A1* | 8/2001 | Eendenburg Van ..... A23D 7/05 426/603 |
| 2003/0161935 A1 | 8/2003 | Kakuda et al. |
| 2015/0327565 A1 | 11/2015 | Aldred et al. |

FOREIGN PATENT DOCUMENTS

| EP | 1331988 B1 * | 6/2006 | .......... B01F 7/00816 |
|---|---|---|---|
| EP | 2606753 | 6/2013 | |
| EP | 2654443 | 1/2016 | |
| GB | 1327511 | 8/1973 | |
| WO | WO-9620270 A1 * | 7/1996 | .......... C11D 11/0094 |
| WO | WO2005014158 | 2/2005 | |
| WO | WO-2013056964 A1 * | 4/2013 | ............... A23D 7/04 |
| WO | WO2014005797 | 1/2014 | |
| WO | WO2014117883 | 8/2014 | |
| WO | WO2015052037 | 4/2015 | |

OTHER PUBLICATIONS

"Topic: Re: Mixing Time and Residence Time". Available online at—https://www.chemicalprocessing.com/experts/mixing/show/343#:~:text=The%20residence%20time%20in%20a,sectional%20area%20of%20the%20pipe. (Year: 2008).*
Co-pending Application: Applicant: de Man et al., Filed: May 16, 2018.
Co-pending Application: Applicant: Lagerwaard et al., Filed: May 16, 2018.
Search Report & Written Opinion in EP15195612 dated Feb. 24, 2016, pp. 1 to 9.
RBD Coconut Oil; Elburg Global Technical Specifications; 2008; pp. 1-2; http://www. elburgglobal.nl, Apr. 4, 2015; XP055249893. pp. 10 to 11.
Search Report & Written Opinion in EP15195609 dated Feb. 24, 2016, pp. 12 to 18.
Search Report and Written Opinion in EP15195607 dated May 17, 2016, pp. 19 to 22.
Search Report and Written Opinion in PCTEP2016076573 dated Dec. 16, 2016, pages 10 to 20.
Search Report and Written Opinion in PCTEP2016076919 dated Jan. 19, 2017, pages 21 to 36.
Search Report and Written Opinion in PCTEP2016076915 dated Jan. 19, 2017, pp. 37 to 49.
Written Opinion 2 in PCTEP2016076915 dated Oct. 5, 2017, pages 1 to 7.
IPRP2 in PCTEP2016076915 dated March 5, 2018, pp. 8 to 20.
IPRP2 in PCTEP2016076919 dated Feb. 20, 2015, pp. 21 to 41.
Search Report and Written Opinion in EP15195619 dated May 3, 2016, pp. 42 to 46.
Written Opinion 2 in PCTEP2016076919 dated Oct. 13, 2017, pp. 47 to 53.

* cited by examiner

*Primary Examiner* — Erik Kashnikow
*Assistant Examiner* — Assaf Zilbering
(74) *Attorney, Agent, or Firm* — Arent Fox LLP

(57) ABSTRACT

A process for preparing a low fat water-in-oil emulsion which emulsion comprises water, oil and a hardstock fat. The process involves combining an aqueous phase and a fat phase, wherein the fat phase comprises the hardstock fat and which fat phase is at a temperature such that the fat phase is liquid, followed by subjecting the obtained mixture to high shear mixing effected a high shear mixing device, and wherein the product exiting the high shear mixing process the product is packed without having been subject to any further mixing or working process.

15 Claims, No Drawings

PROCESS FOR PREPARING FAT CONTINUOUS EMULSIONS LOW IN FAT

FIELD OF INVENTION

The present invention relates to a process for preparing fat-continuous emulsions (such as e.g. spreads and margarines) which emulsions comprise, next to water, the fat components oil and hardstock fat, and which emulsion is low in fat. The process allows the production of low fat spreadable emulsions which do not need strong emulsifiers like polyglycerol polyricinoleate or stabilisers of the aqueous phase like starch or gelatine.

BACKGROUND OF INVENTION

Edible water-in-oil emulsions, which comprise a continuous fat phase and a dispersed aqueous phase, are well known in the art and include for example margarine.

The fat phase of margarine and similar water-in-oil emulsions is typically a mixture of liquid oil (i.e. fat that is liquid at ambient temperature) and fat which is solid at ambient temperatures. The solid fat, also called structuring fat or hardstock fat, serves to structure the fat phase and helps to stabilize the aqueous phase (e.g. in the form of droplets) by forming a fat crystal network. Ideally the structuring fat has such properties that it melts or dissolves at mouth temperature otherwise the product may have a heavy and/or waxy mouthfeel.

Margarine is generally defined as a composition containing at least 80 wt. % fat and about 20 wt. % aqueous phase. In contrast, (spreadable) emulsions containing less than 80 wt. % fat are generally called spreads. Nowadays the terms margarine and spread are sometimes used interchangeably although in some countries the commercial use of the term margarine is subject to certain regulatory requirements.

In the market place margarine is generally sold as one of three principal types of water-in-oil emulsion:
  hard or stick margarine (also referred to as wrappers);
  (typically softer) tub margarine (typically named "spreads)"; and
  liquid or pourable margarine.

Wrapper margarines and tub margarines are non-pourable and generally contain a higher amount of hardstock fat than liquid or pourable margarines.

There is an interest with at least part of the consumers for low fat spreads, which contain fat in an amount of 50% or less. Manufacturing such fat-continuous low fat spreads (e.g. having fat levels of 15 to 50% by weight) usually requires additional ingredients next to the usual fatty acid monoglyceride-based emulsifiers, as such fat-continuous low fat spreads are quite unstable. This instability both creates difficulty in manufacturing and in stability over time, especially when the storage is at room temperature. Such additional ingredients traditionally incorporated in fat-continuous low fat spreads are either strong emulsifiers like polyglycerol polyricinoleate (PGPR) or thickeners of the aqueous phase like starch or other carbohydrate-based thickeners or gelatine or other gelling proteins, or all of these additional ingredients together. The use of such additional ingredients may be undesired for various reasons, e.g when wishing to be able to manufacture fat-continuous low fat emulsions which have a "cleaner label", i.e. a product declaration with as few as possible functional ingredients.

The general process for the manufacture of water-in-oil emulsions, using the votator or churn process, encompasses the following steps:

1. Mixing of the liquid oil, the hardstock fat and the water-phase at a temperature at which the hardstock fat is definitely liquid;
2. cooling of the mixture under high shear to induce crystallization of the hardstock fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.A disadvantage of such process is that it requires heating up and cooling the whole formulation, e.g. including all oil and all water. This costs a lot of energy. Melanges containing dairy fat next to vegetable fat as set out above can easily be made with such votator process, in which butter fat is melted and added to the total ingredient mix that is fed to the processing line.

An alternative to the votator or churn process for the manufacture of margarines which is known involves the use of fat powder comprising hardstock fat (i.e. pre-crystallized fat) (WO 2005/014158). The fat powder used in such process is also known as ScMM powder (super critical melt micronisation) or PGSS process (particles from gas saturated solutions). Spreads can be made by blending at ambient or colder temperature liquid oil, the fat powder and an aqueous phase. This overcomes having to heat and cool the entire formulation. Disadvantages of such process relate e.g. to the need for equipment which is new in margarine and spreads making (pressurizing and handling $CO_2$, spraying melted fat, handling fat powder), capital expenditure. Also, the method proves to be less attractive for high-fat products (e.g. 70-85%).

A further alternative for making spreads is known e.g. from GB1327511. This reference discloses a process for the preparation of low-calorie spreads by mixing a first liquid (which is at a temperature of at least 28° C.) which consists of a fat phase containing crystallisable material with a second liquid (which is at a temperature of at most 8° C.) which is substantially free from crystallisable material. At least part of the second liquid is composed of the aqueous phase, and may further contain oils which are liquid at 2° C. The two liquids are fed separately to a high pressure dosing pump, allowing continuous dosing of the liquids.

There is a desire for a process that allows the manufacture of fat-continuous low-fat emulsions (e.g. spreads), with fat levels of between 15 and 50% by weight, which emulsions comprise vegetable oil and hardstock, yet which manufacturing process does not require the use polyglycerol polyricinoleate (PGPR), carbohydrate-based thickeners like starch, or protein-based gelling agents like gelatin. At the same time, it is desired that the process does not need complex equipment such as is e.g. needed for making the fat powder using the PGSS process.

SUMMARY OF THE INVENTION

It was found that these objectives can be met, at least in part, by a process for making a spreadable, edible water-in-oil emulsion comprising fat in an amount of from 15% to 50%, by weight based on the total emulsion and water in an amount of from 50 to 85%, by weight based on the total emulsion, which process comprises the steps of:
a. preparing an aqueous phase comprising at least water,
b. preparing a fat phase comprising vegetable oil, hardstock fat and fatty acid monoglyceride emulsifier, which fat phase is at a temperature such that the whole fat phase is liquid, and wherein the temperature is below 60° C., preferably below 50° C.,
c. combining the aqueous phase and the fat phase, and
d. subject such to a high shear mixing process in a high shear mixer having a rotor and a stator, with a residence time of less than 3 seconds, and sufficient shear to effect emulsification of water droplets in oil having a droplet size $d_{3,3}$ of less than 15 micrometer, wherein the product exiting the high shear mixing process the product is packed without having been subject to any further mixing or working process.

DETAILED DESCRIPTION OF THE INVENTION

"Hardstock" ("hardstock" and "hardstock fat" and "hardstock phase" herein have the same meaning) is herein to be understood to be an edible fat that is solid at ambient temperature as understood by the person skilled in the art.

In order to obtain a fat-continuous emulsion with water droplets of the desired size and the formation of small crystals of hardstock that can stabilise such emulsion and that can give sufficient firmness to the product, the mixing of the combination of aqueous phase and oil with the melted hardstock should go in a swift way, and also the mixing operation should only result in a small temperature increase due to such high shear mixing. Regarding the latter, it is preferred that the high shear device results in a temperature increase of the emulsion of less than 5° C., more preferably a temperature increase of the emulsion of less than 3° C., when comparing temperature of the aqueous dispersion at the inlet and the temperature of the emulsion at the outlet of the high shear device. It was found that a high shear mixer having a rotor and a stator, which mixer has a residence time of less than 3 seconds, and sufficient shear to effect emulsification of water droplets in oil having a droplet size $D_{3,3}$ of less than 15 micrometer, can achieve such objectives. Hence, preferably the high shear device in step d. is such high shear mixer. A typical example of a mixer that can achieve the desired objectives is a fluid division mixer (FDM) as marketed by Maelstrom and as is described e.g. in EP1331988, in WO2002/38263, and in WO2013/037605.

In the process according to the invention, combining the aqueous phase and fat phase in step c. is conveniently effected in a continuous way by combining the two streams in-line.

Depending on e.g. the temperature of the waterphase and/or especially in the case of very low fat levels (around 20-35%) it may be beneficial that after combining the aqueous phase and the fat phase the combined stream is subjected to a stirring or mixing operation, with less shear than the high shear mixer. For this reason, it may be preferred in the process according to the present invention that after combining the aqueous phase and the fat phase the combined mixture in step c. and before subjecting such to a high shear mixing process the combined mixture is subjected to low shear mixer, which low shear mixer effects lower shear than the high shear of step d. The low shear mixer in the in the above is preferably a pin-stirrer (e.g as they are well known and available in margarine and spreads production). Pin stirrers in margarine processing are also known as C-units. Suitable pin stirrers are e.g. those having a residence time of between 15 seconds and 4 minutes, and a speed of between 50 and 300 rpm. With such pin stirrers tip speeds of between 0.5 and 6 m/s are preferred, more preferably between 1 and 4 m/s. It was found that with such stirring or mixing (e.g. by a pin-stirrer) smaller water droplets may be obtained, which may be beneficial especially with water temperatures on the high end of what is claimed, and more in particular for low fat levels (e.g. 20-35%).

In the process according to the present invention, it proved beneficial that the emulsion exiting the high shear mixer is fed to a packaging line to pack the product in individual packs, and not e.g. first subjecting the mixture from the high shear mixer to further mixing equipment. In particular, it is preferred that in between the high shear mixer and the packaging line the resulting product is not subjected to the effect imparted by stirring, working, or crystallizing equipment.

The amount of hardstock is generally as low as possible (e.g. for reasons of low SAFA) but as high as is needed for achieving the desired emulsion stability and firmness. To achieve a good balance between melting properties and stability, it is preferred the vegetable oil and the hardstock are present in the emulsion in a weight ratio vegetable oil:hardstock of between 10:1 to 1:5.

A convenient way to obtain hardstock fats is by a process which involves hardening of vegetable oils. Partial hardening may give beneficial properties with respect to melting behaviour and emulsion stablisation, yet such partial hardening may give rise to the formation of trans-unsaturated fatty acids in the triglycerides of the hardstock fat. Such trans-unsaturated fatty acids in the triglycerides ("transfats") are undesired from a health perspective. Hence, despite their beneficial structuring properties it is preferred that in the process according to the present invention the fat phase of the emulsion comprises less than 1% of trans-unsaturated fatty acids in the triglycerides, by weight on the total fat phase of the emulsion, more preferably the emulsion comprises less than 0.5% of trans-unsaturated fatty acids.

Preferably, for reasons of consumer acceptance and the image of being all natural, the hardstock fat comprises at least 70% (more preferably at least 80%) of triglyceride esters of fatty acids (TAG's), by weight based on the total hardstock fat.

Although it was found that with the presently claimed process, fat-continuous low fat emulsions with good (emulsion or water droplet) stability can be prepared without using strong emulsifiers like PGPR, it is still required that some fatty acid monoglyceride emulsifier is used. The amount of such is preferably as low as possible, and as high as is needed for forming and keeping the emulsion. Hence, in the present process, the fatty acid monoglyceride emulsifier is present in an amount of from 0.05 to 2% by weight, based on the total emulsion. Preferably, the fatty acid monoglyceride emulsifier is present in an amount of from 0.1 to 1.5% by weight, based on the total emulsion, more preferably from 0.2 to 1.2% by weight, based on the total emulsion.

As mentioned, the presently claimed process allows the fat-continuous emulsions to be prepared without the need to include PGPR. This is beneficial as PGPR may be perceived by consumers as too artificial. Hence, in the process according to the present invention, it is preferred that the emulsion does not contain polyglycerol polyricinoleate.

Total desired fat levels of the emulsions made by the process according to the present emulsion are (for consumer preference) below 50%, but lower may be preferred by some consumes. A minimum of fat is required to allow for the water droplets in fat-continuous emulsions. Following this, it is preferred in the present invention that the emulsion comprises fat in an amount of from 18% to 35%, by weight based on the total emulsion and water in an amount of from 65% to 82%, by weight based on the total emulsion.

It may be desired to include in the low fat emulsions made by the process of the present invention a low amount of high melting fat, as this makes processing a bit more robust. If applied, it is desired to keep this amount as low as possible, as high amounts may lead to grittiness in the mouth and/or undesired fatty acid profiles from a health perspective. A preferred high melting fat in this respect is fully hardened rapeseed oil, also known as RP70, as rapeseed oil has very long chain fatty acids. Thus, it is preferred that the emulsion in the process according to the present invention comprises 0.1 to 2% of fully hardened rapeseed oil.

Often, emulsions like are subject of the present invention contain a gelling biopolymer such as gelling protein. Gelling proteins are often included in conventional low fat spreads for stability reasons, but such gelling proteins may negatively impact mouthfeel, and also some of them such as gelatine have a negative consumer image linked to e.g. BSE-disease. Thus, it is preferred that in the process according to the present invention, that the emulsion does not comprise a gelling protein. Preferably in the process of the present invention, the emulsion does not contain gelatine.

Often, emulsions like are subject of the present invention contain a gelling biopolymer such as gelling carbohydrate (e.g. starch or a derivative thereof) for achieving increased stability. However, it is a distinct benefit of the present invention that the presently claimed process does not need such gelling carbohydrate or carbohydrate based thickener. Thus, for reasons of consumer preference and to have product label which is as clean as possible, it is preferred in the present invention that the emulsion in the process according to the present invention does not contain a carbohydrate thickener. Preferably the product produced by the present process does not contain starch or a starch-derivative.

Although the process according to the present invention may yield liquid products or wrapper-type margarines, it is preferred that the fat continuous emulsion made by this process is a spreadable emulsion. A spreadable emulsion is an emulsion of the composition as described herein, which furthermore has a Stevens value of between 30 and 300 gram, when measured at 5° C.

EXAMPLES

Methods
Water Droplet Size Distribution of W/O Emulsions

The normal terminology for Nuclear Magnetic Resonance (NMR) is used throughout this method. On the basis of this method the parameters $d_{3,3}$ and $\exp(\sigma)$ of a lognormal water droplet size distribution can be determined. The $d_{3,3}$ is the volume weighted mean droplet diameter (in microns, in the present case) and $e^\sigma$ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3.3 (volume weighted geometric mean diameter) and σ (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Examples 1, 2 and 3

20% Fat Spread, Different Temperatures Waterphase

Three spreadable edible emulsions were prepared having the recipe as in Table 1. Examples 1, 2 and 3 were of identical composition and identical processing, except for the temperature of the waterphase when being combined with the oil phase.

TABLE 1

| Component | Amount (wt % on total) | Phase |
| --- | --- | --- |
| Water | 76.91 | Water phase |
| Salt | 2.5 | Water phase |
| Minors (Potassium Sorbate, EDTA, vitamins) | 0.06 | Water phase |
| Palm olein fractionate (single stage dry fractionated palm oleine with Iodine Value of 56) | 6 | Oil phase |
| Palm oil | 14.0 | Oil phase |
| Mono and diglycerides (Dimodan-UJ ex Grindstedt, Denmark; distilled 90% unsaturated monoglyceride of Sunflower Oil)) | 0.3 | Oil phase |
| Rape70 (fully hydrogenatated Rapeseed oil) | 0.22 | Oil phase |
| Flavor, colour & vitamins | 0.01 | Oil phase |

The composition was made by first preparing the water phase in a premix vessel. The oil phase was made by mixing all ingredients for this phase in a second premix vessel.

The water phase and oil phase were then combined in-line and fed directly to the high shear mixer. The oil phase temperature at the point of mixing was 43° C. (±2). The water phase temperature at the point of mixing was 5° C. (example 1), 12° C. (example 2) and 19° C. (example 3).

This was fed to a 3 liter pin-stirrer operating at 100 rpm, followed by a high shear mixer (operating at 2800 rpm). This mixer was of the type FDM, or fluid division mixer by Maelstrom, similar as in WO 02/38263, with a concentric rotor-stator system with 4 rows of cavities in both rotor and stator, with a total volume of 0.083 liter. The cavities in the rotor and stator were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). The resulting product coming out of the high shear mixer had the appearance of a spread.

Examples 4, 5 and 6

20% Fat Spread, Different Temperatures Waterphase

Three spreadable edible emulsions were prepared having the recipe as in Table 2.

TABLE 2

| Component | Amount (wt % on total) | Phase |
|---|---|---|
| Water | 77.13 | Water phase |
| Salt | 2.5 | Water phase |
| Minors (Potassium Sorbate, EDTA, vitamins) | 0.06 | Water phase |
| Palm olein fractionate (single stage dry fractionated palm oleine with Iodine Value of 56) | 6 | Oil phase |
| Palm oil | 14.0 | Oil phase |
| Mono and diglycerides (Dimodan-UJ ex Grindstedt, Denmark; distilled 90% unsaturated monoglyceride of Sunflower Oil)) | 0.3 | Oil phase |
| Flavor, colour & vitamins | 0.01 | Oil phase |

The composition was made by first preparing the water phase in a premix vessel. The oil phase was made by mixing all ingredients for this phase in a second premix vessel.

The water phase and oil phase were then combined in-line and fed directly to the high shear mixer. The oil phase temperature at the point of mixing was 43° C. (±2). The water phase temperature at the point of mixing was 5° C. (example 4), 12° C. (example 5) and 19° C. (example 6).

This was fed to a 3 liter pin-stirrer operating at 100 rpm, followed by a high shear mixer (operating at 2800 rpm). This mixer was of the type FDM, or fluid division mixer by Maelstrom, similar as in WO 02/38263, with a concentric rotor-stator system with 4 rows of cavities in both rotor and stator, with a total volume of 0.083 liter. The cavities in the rotor and stator were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). The resulting product coming out of the high shear mixer had the appearance of a spread.

Comparative Examples A and B (Comparative to Examples 2 and 3)

Two spreadable edible emulsions were prepared having the recipe as in Table 3, the difference was in the processing.

TABLE 3

| Component | Amount (wt % on total) | Phase |
|---|---|---|
| Water | 76.28 | Water phase |
| Salt | 2.5 | Water phase |
| Minors (Potassium Sorbate, EDTA, vitamins) | 0.06 | Water phase |
| Palm olein fractionate | 6 | Oil phase |
| Palm oil | 14.0 | Oil phase |
| RP70 | 0.4 | Oil phase |
| PGPR (polyglycerol ricinoleate) | 0.45 | Oil phase |
| Mono and diglycerides | 0.3 | Oil phase |
| Flavor, colour & vitamins | 0.01 | Oil phase |

The composition was made by first preparing the water phase in a premix vessel. The oil phase was made by mixing all ingredients for this phase in a premix vessel. The water phase and oil phase were then combined in-line and fed directly to the high shear mixer.

The oil phase temperature at the point of mixing was 43° C. (±2). The water phase temperature at the point of mixing was, 12° C. (example A) and 19° C. (example B). This was fed to a high shear mixer (operating at 2800 rpm). This mixer was of the type FDM, or fluid division mixer by Maelstrom, similar as in WO 02/38263, with a concentric rotor-stator system with 4 rows of cavities in both rotor and stator, with a total volume of 0.083 liter. The cavities in the rotor and stator were spherical segments which are open on both vertical and horizontal faces. The rotor and stator are based on a stepped conical form so that the diameter of the cone increases from inlet to outlet (about 50 up to 150 mm). The mixer is commercially available from Maelstrom (http://www.maelstrom-apt.com/product-dc50/). The resulting product coming out of the high shear mixer had the appearance of a spread.

Results

The spreads prepared under the examples as set out above were stored for 1 week at ambient conditions (at a temperature of about 20° C.), and the waterdroplet size D3,3 was measured and the distribution of the droplet size (e-sigma). the results is in tables 4-6.

The spreads as prepared under examples as set out above were also subject to a cycling test, to mimic sub tropical conditions. The protocol for such cycling C-test was: keeping the product for 2 days at 30° C., followed by 4 days at 10° C., followed by 1 day at 10° C., followed by stabilization at about 20° C. for at least two days.

TABLE 4

|  | Example 1 | Example 2 | Example 3 |
|---|---|---|---|
| Water phase temperature | 5 | 12 | 19 |
| $d_{3,3}$ after 1 wk at ambient | 2.6 | 2.6 | 3.8 |
| E sigma after 1 wk at ambient | 2.5 | 2.0 | 3.2 |
| $d_{3,3}$ after C-cycle | 4.0 | 4.1 | 6.6 |
| E sigma after C-cycle | 2.4 | 1.8 | 2.5 |

TABLE 5

|  | Example 4 | Example 5 | Example 6 |
|---|---|---|---|
| Water phase temperature | 5 | 12 | 19 |
| $d_{3,3}$ after 1 wk at ambient | 2.4 | 2.6 | 3.8 |
| E sigma after 1 wk at ambient | 2.3 | 3.4 | 4.5 |
| $d_{3,3}$ after C-cycle | 3.9 | 5.3 | 7.8 |
| E sigma after C-cycle | 2.30 | 2.7 | 6.4 |

TABLE 6

|  | Comparative A | Comparative B |
|---|---|---|
| Water phase temperature | 12 | 19 |
| $d_{3,3}$ after 1 wk at ambient | 2.0 | 2.4 |
| E sigma after 1 wk at ambient | 2.3 | 2.2 |
| $d_{3,3}$ after C-cycle | 3.9 | 4.9 |

TABLE 6-continued

| | Comparative A | Comparative B |
|---|---|---|
| E sigma after C-cycle | 1.8 | 1.7 |

These results show that with the process of the invention very low fat spreads (20% fat) can be made without the need to employ stabilisers such as starch or gelatine and without the need to use strong emulsifiers like PGPR, and yet such emulsions have sufficient emulsion stability.

The invention claimed is:

1. A process for making a spreadable, edible water-in-oil emulsion comprising fat in an amount of from 15% to 50%, by weight based of the total emulsion and water in an amount of from 50 to 85%, by weight based on the total emulsion, which process comprises the steps of:
   a) preparing an aqueous phase comprising at least water,
   b) preparing a fat phase comprising a vegetable oil, a hardstock fat and a fatty acid monoglyceride emulsifier, wherein the fat phase is at a temperature such that the whole fat phase is liquid, and wherein the temperature is below 60° C.,
   c) combining the aqueous phase and the fat phase to form a mixture, and
   d) subjecting the mixture to a high shear mixing process in a high shear mixer having a rotor and a stator, with a residence time of less than 3 seconds, and sufficient shear to form an emulsion comprising water droplets in oil having a droplet size $d_{3,3}$ of less than 15 micrometers,
   wherein the emulsion produced in step d) is packed after exiting the high shear mixer without having been subject to any further mixing or working process.

2. The process of claim 1, wherein the high shear mixing process is performed by a fluid division mixer.

3. The process of claim 1, wherein combining the aqueous phase and fat phase in step c) comprises providing the aqueous phase and the fat phase as two separate streams and combining the two streams in-line.

4. The process of claim 1, wherein the mixture produced in step c) is subjected to low shear mixing step prior to step d), said low shear mixing comprising a lower shear than the high shear applied in step d).

5. The process of claim 4, wherein the low shear mixing is performed by a pin stirrer.

6. The process of claim 1, wherein the emulsion exiting the high shear mixer is fed to a packaging line to pack the emulsion in individual packs.

7. The process of claim 6, wherein the emulsion formed in step d) is not subjected to stirring, working, or crystallizing equipment prior to being packed.

8. The process of claim 1, wherein the vegetable oil and the hardstock are present in the emulsion in a weight ratio vegetable oil:hardstock of between 10:1 to 1:5.

9. The process of claim 1, wherein the fatty acid monoglyceride emulsifier is present in an amount of from 0.05 to 2% by weight, based on the total emulsion.

10. The process of claim 1, wherein the emulsion comprises fat in an amount of from 18% to 35%, by weight based on the total emulsion and water in an amount of from 65% to 82%, by weight based on the total emulsion.

11. The process of claim 1, wherein the emulsion comprises 0.1 to 2% of fully hardened rapeseed oil.

12. The process of claim 1, wherein the emulsion does not comprise a gelling protein.

13. The process of claim 1, wherein the emulsion does not contain a carbohydrate thickener.

14. The process of claim 1, wherein the emulsion does not contain polyglycerol polyricinoleate.

15. The process of claim 1, wherein the high shear mixing performed in step d) results in a temperature increase of the emulsion of less than 3° C.

* * * * *